United States Patent
DeStefano et al.

(10) Patent No.: US 9,637,884 B1
(45) Date of Patent: *May 2, 2017

(54) JACKABLE BUILDING FOUNDATION

(71) Applicant: High Tide Homes Inc., Fairfield, NJ (US)

(72) Inventors: Philip DeStefano, Verona, NJ (US); John Bianco, Verona, NJ (US)

(73) Assignee: High Tide Homes Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,709

(22) Filed: Apr. 13, 2016

(51) Int. Cl.
*E02B 17/08* (2006.01)
*E02D 27/32* (2006.01)
*E04H 9/14* (2006.01)

(52) U.S. Cl.
CPC ............ *E02D 27/32* (2013.01); *E04H 9/145* (2013.01); *E02D 2200/11* (2013.01); *E02D 2600/10* (2013.01)

(58) Field of Classification Search
CPC ..... E04H 9/145; E02B 17/0809; E02D 27/32; B63B 2035/4426
USPC .... 405/195.1, 196, 198, 203, 218, 219, 221, 405/229, 230, 231, 232; 114/44, 45, 48, 114/264, 265; 51/1, 64, 169.1, 169.2, 51/169.9, 292
See application file for complete search history.

(56) References Cited

U.S. PATENT DOCUMENTS

| | | | | |
|---|---|---|---|---|
| 4,375,931 A | * | 3/1983 | Erdt ..................... | B25H 1/0064 408/129 |
| 4,427,127 A | * | 1/1984 | Kalkowski ............. | B65D 88/50 220/218 |
| 5,140,923 A | * | 8/1992 | Wood ....................... | B63C 3/06 114/48 |
| 5,509,562 A | * | 4/1996 | Jolly ..................... | B65D 88/34 220/216 |
| 6,695,542 B2 | * | 2/2004 | Stromberg ............. | E21B 19/24 166/341 |
| 7,921,604 B2 | * | 4/2011 | Lino ........................ | E04H 9/14 114/264 |
| 9,249,594 B2 | * | 2/2016 | DeStefano ............. | E02D 27/32 |

* cited by examiner

*Primary Examiner* — Benjamin Fiorello
*Assistant Examiner* — Edwin Toledo-Duran
(74) *Attorney, Agent, or Firm* — Thomas J. Germinario

(57) ABSTRACT

A jackable building foundation includes a steel beam support frame platform to which one or more hydraulic jacks are attached. Vertical movement of the platform in response to jacking is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven jacking are suppressed and do not result in jamming of the platform as it rises.

8 Claims, 6 Drawing Sheets

JACKABLE BUILDING FOUNDATION

FIELD OF INVENTION

The present invention relates to the field of building foundations, and more particularly to elevated and jackable building foundations, the movement of which is constrained by guide columns.

BACKGROUND OF THE INVENTION

Homes and other buildings located in shore areas are subject to the risk of damage and destruction from floodwaters associated with storm surges. Construction of foundations for homes/buildings above the flood hazard elevation is often not practical from a technical and/or economic standpoint. Even where foundation construction above historic flood levels is feasible, the trend toward increasingly powerful storm surges in recent years poses a risk to any building in proximity to a large body of water.

One potential approach to minimize the risks associated with storm surges is to design a jackable foundation that can be raised and lowered with the flood water level. While designs for jackable building structures are known, the problem of maintaining a level platform under conditions of variable and/or unevenly-distributed lifting force has heretofore not been satisfactorily solved.

SUMMARY OF THE INVENTION

The present invention comprises a steel beam support frame platform to which one or more hydraulic jacks are attached. Vertical movement of the platform in response to jacking is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven jacking are suppressed and do not result in jamming of the platform as it rises.

In one embodiment, the jackable building foundation additionally comprises a processing means, which can be microprocessor or CPU, which receives remote instructions to raise and lower the platform through one or more wireless communication and/or routing components, which can include without limitation, a wireless telephone module, a wi-fi module, an rf receiver, and/or an infrared sensor.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
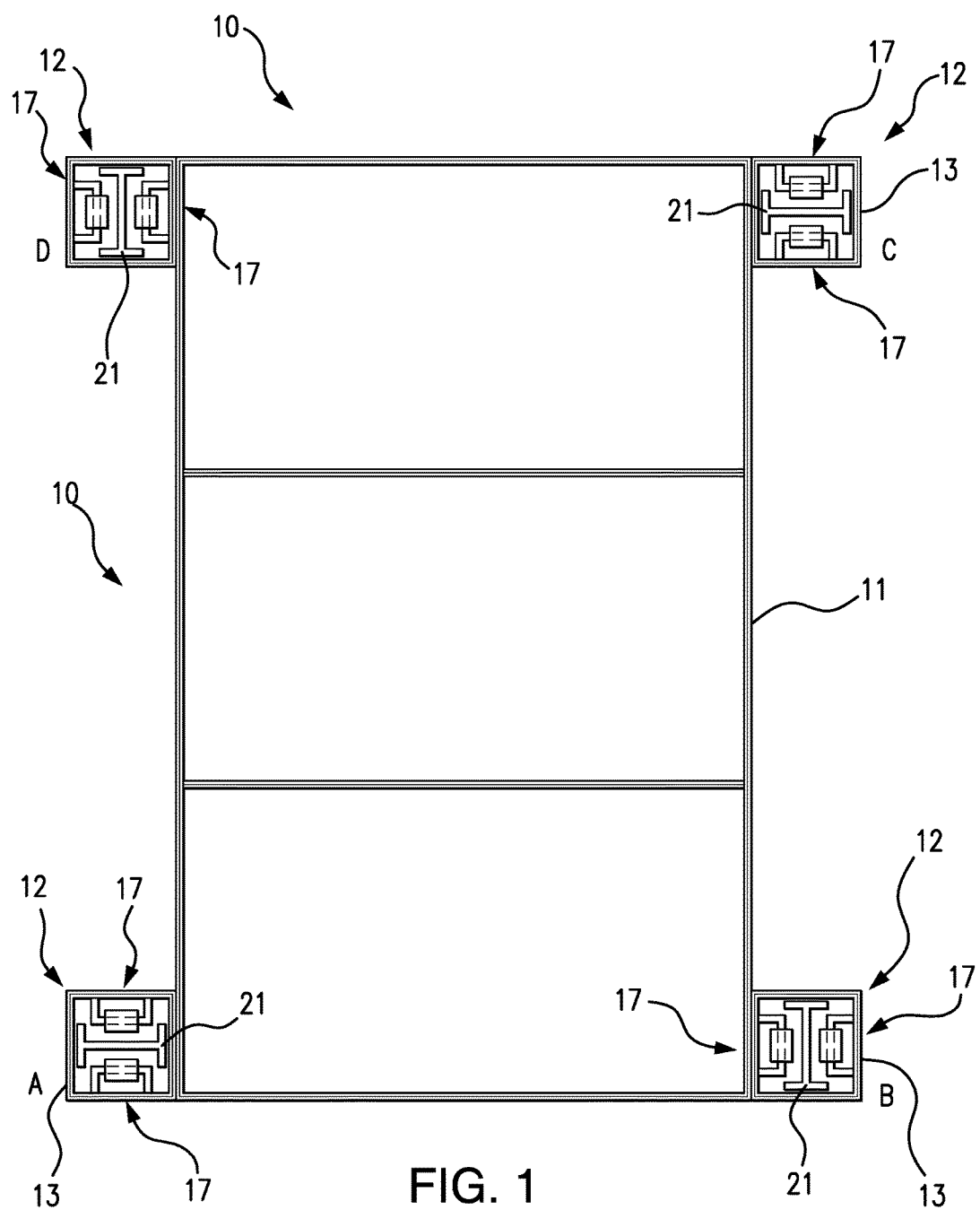
FIG. 1 is a plan view of a jackable house foundation support according to the preferred embodiment of the present invention.
Figure 2:
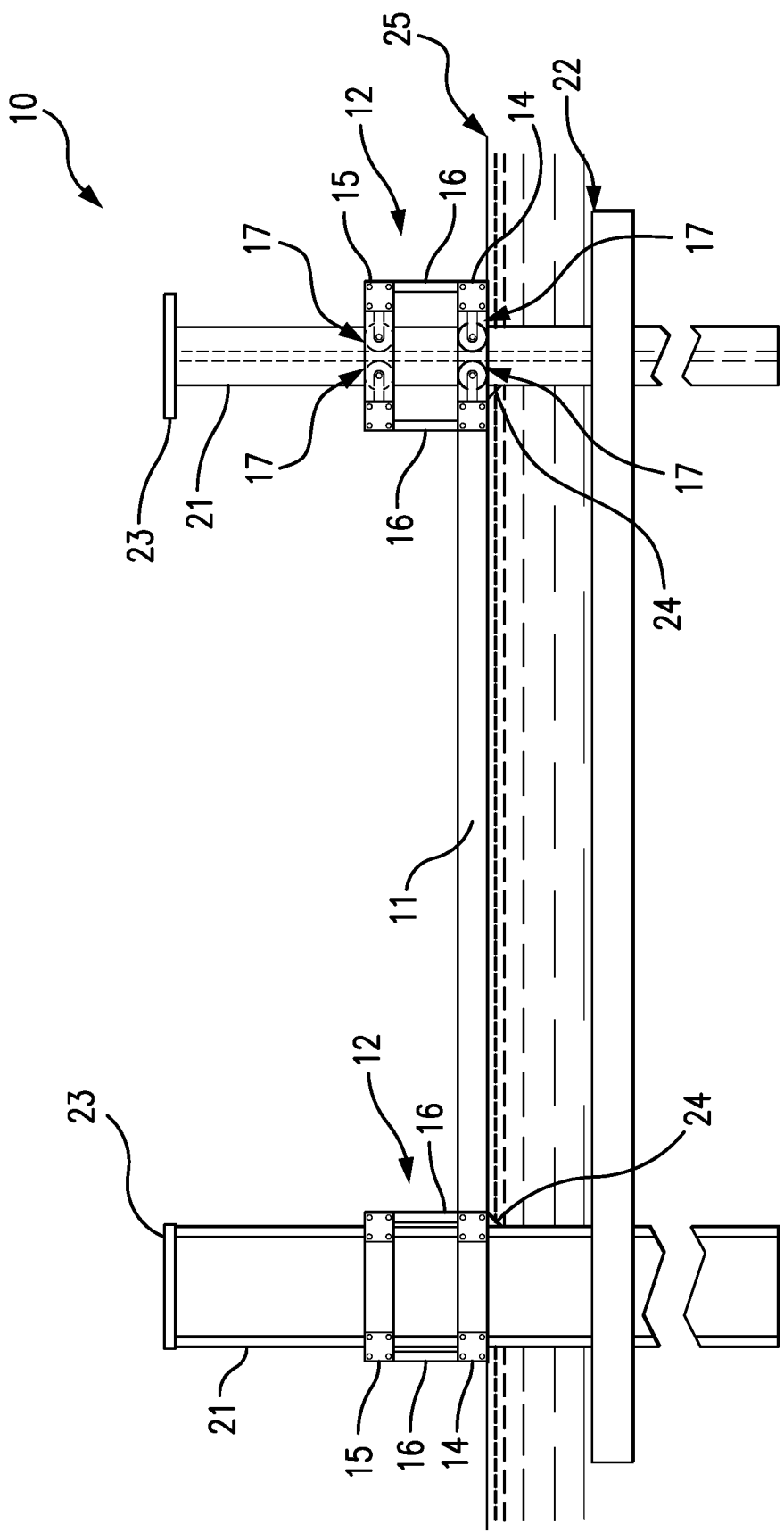
FIG. 2 is a side profile view of a jackable house foundation support according to the preferred embodiment of the present invention.

Referring to FIGS. 1 and 2, a jackable building foundation according to the preferred embodiment of the present invention 10 comprises a rectangular steel foundation support platform 11 with four cuboidal column guides 12, one at each corner. Each of the cuboidal column guides 12 comprises two interconnected square roller frames 13: a first tier roller frame 14 at the level of the foundation support platform 11, and a second tier roller frame 15 several feet above the level of the foundation support platform 11. The first and second tier roller frames 13 are rigidly interconnected at the corners by vertical members 16, so as to form an open cuboidal structure 12.

Figure 5:
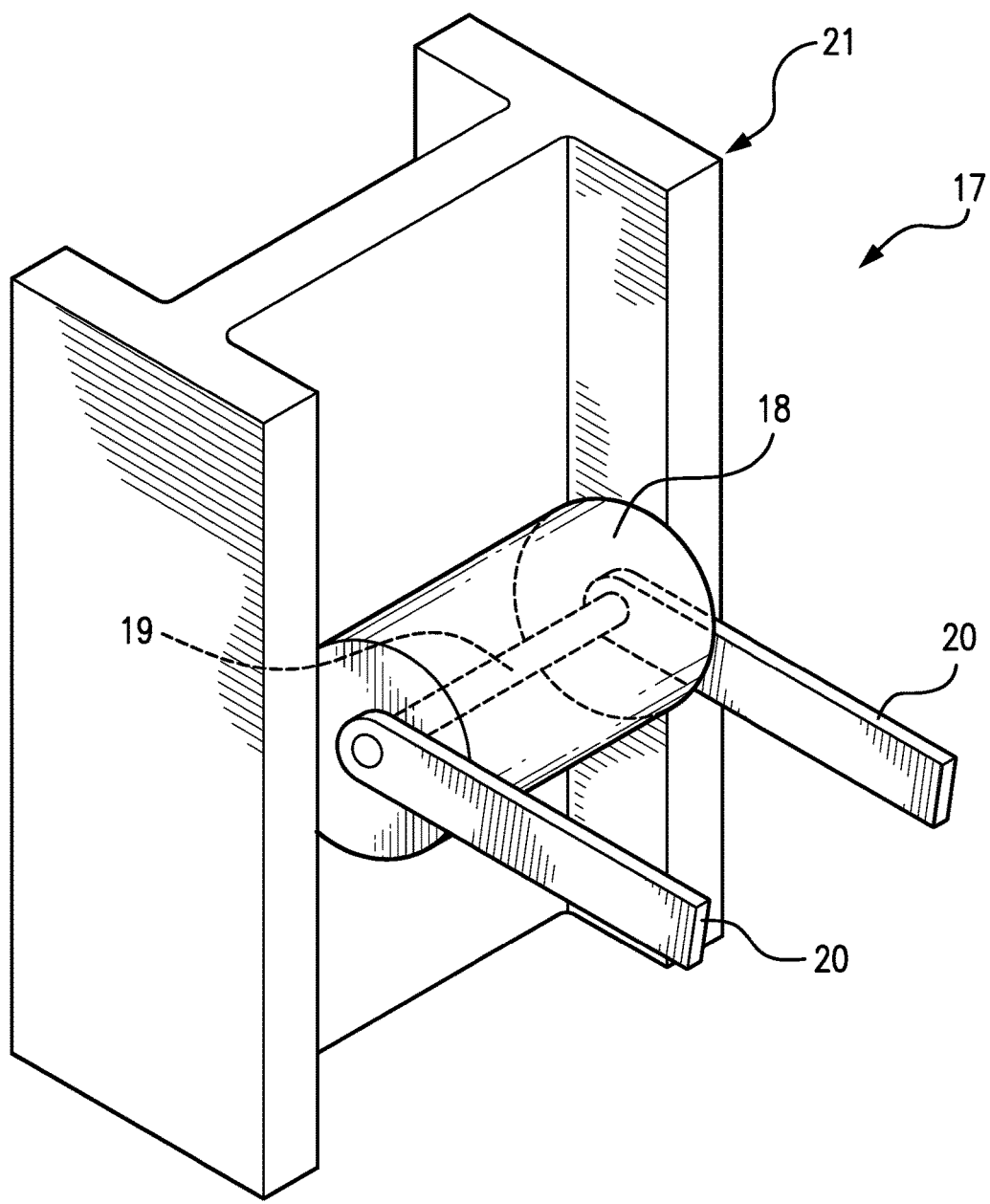
FIG. 5 is a perspective detail view of a roller mechanism according to the preferred embodiment of the present invention.

As best shown in FIG. 1 and in the detail view of FIG. 5, each roller frame 13 contains within it two roller mechanisms 17 on opposing sides on the roller frame 13. Each roller mechanism 17 comprises a cylindrical roller 18 having an axial bore 19, through which it is horizontally rotatably supported by a roller rod 20 attached to the roller frame 13. The opposing rollers 18 of each roller frame 13 slidably engage the opposing faces of a flanged column beam 21.

Four flanged column beams 21 are vertically disposed at each corner of the foundation support platform 11 and are securely anchored in footings below the underlying grade elevation 22. As described above, each of the cuboidal column guides 12 slidably encompasses a section of one of the column beams 21, such that the foundation support platform 11 can ride up and down along the column beams 21. The range of such motion is limited by column caps 23 at the top of the column beams 21 and frame stop blocks 24 laterally extending from the column beams 21 at a predetermined non-raised platform elevation 25.

Figure 3:
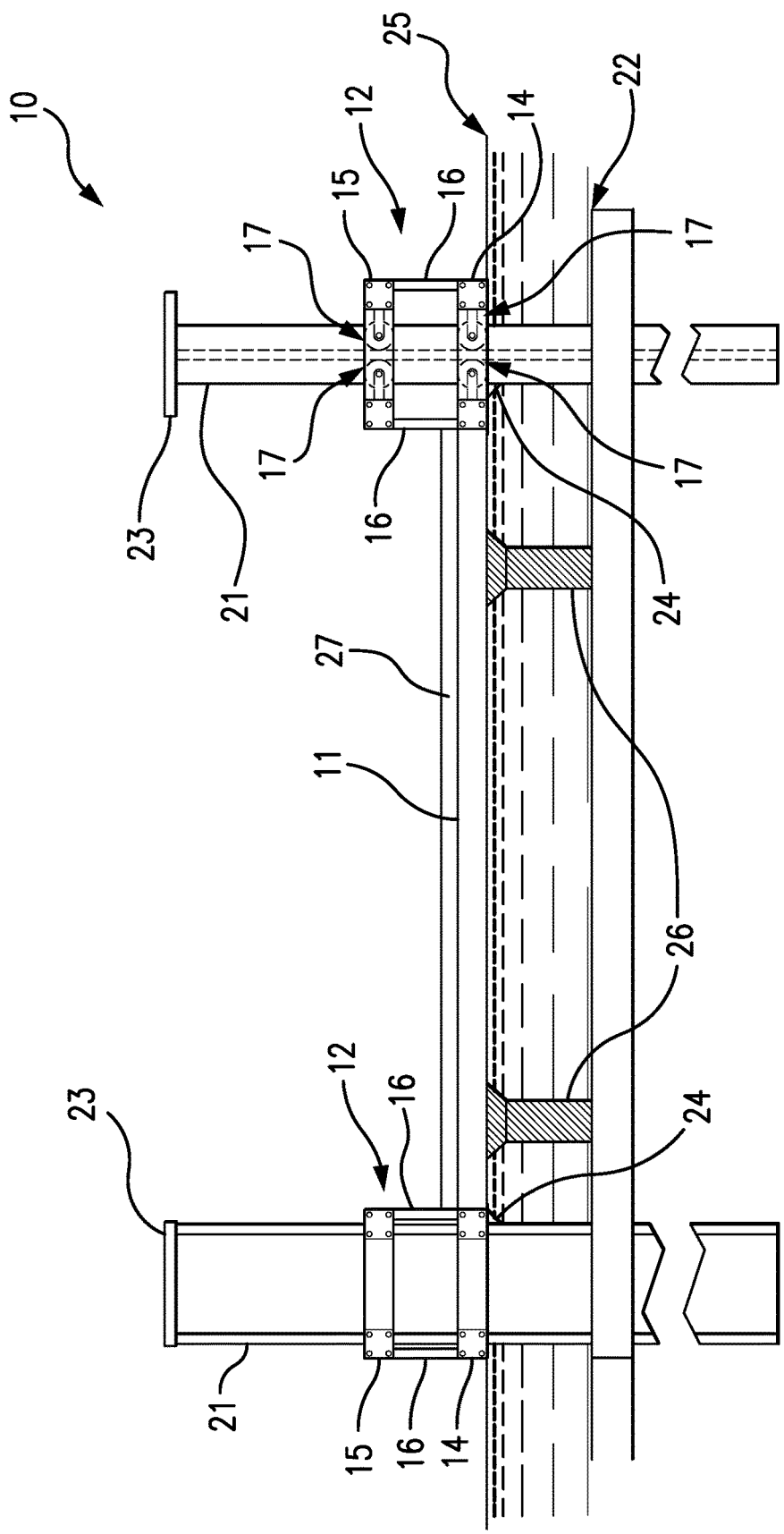
FIG. 3 is a side profile view of a house section supported on a jackable house foundation support according to the preferred embodiment of the present invention.

Referring to FIG. 3, the jackable building foundation 10 is depicted in the non-raised condition, with the foundation support platform 11 resting on the frame stop blocks 24 above multiple hydraulic jacks 26 attached to the bottom of the foundation support platform 11 with a clearance above the underlying grade 22. The hydraulic jacks 26 can be scissor jacks, such as that disclosed in U.S. Pat. No. 4,175,644, which is incorporated herein by reference. The sizes and positions of the hydraulic jacks 26 are based on the weight distribution of the building to be lifted.

The total lifting force of the hydraulic jacks 26 should exceed the weight of the building and the foundation support platform 11 sufficiently to lift the foundation support platform to a designated raised platform elevation above the maximum flood elevation. The overall resultant lifting force of the hydraulic jacks 26 should align with the overall center of gravity of the building and foundation support platform 11, in order to avoid the generation of torques, which would otherwise cause the foundation support platform 11 to rise unevenly and tend to cause jamming of the roller frames 13 on the column beams 21.

Since lateral forces associated with a storm surge may also subject the foundation support platform 11 to torques, the preferred embodiment of the present invention 10 minimizes the risk of torque-induced jamming of the roller frames 13 in two ways. First, the roller frames 13 are incorporated into the cuboidal column guides 12, in which the rigid vertical members 16 resist any torque that would tend to rotate the roller frames 13 out of the horizontal plane and thereby deform the cuboidal structure of the column guides 12. Second, as best seen in FIG. 1, the orientation of the column beams 21 alternates orthogonally at each corner of the foundation support platform 11, so that the roller frame 13 of one corner is always immobile with respect to torques which would cause the roller frame 13 of the opposite corner to slide. For example, referring to FIG. 1, a clockwise transverse torque (tending to rotate the platform 11 from side AD toward side BC) would encounter immobility in corners A and C, where the column beams 21 are orthogonal to their counterparts in corners B and D. Conversely, a clockwise longitudinal torque (tending to rotate the platform 11 from side AB toward side CD) would encounter immobility in corners B and D.

Figure 4:
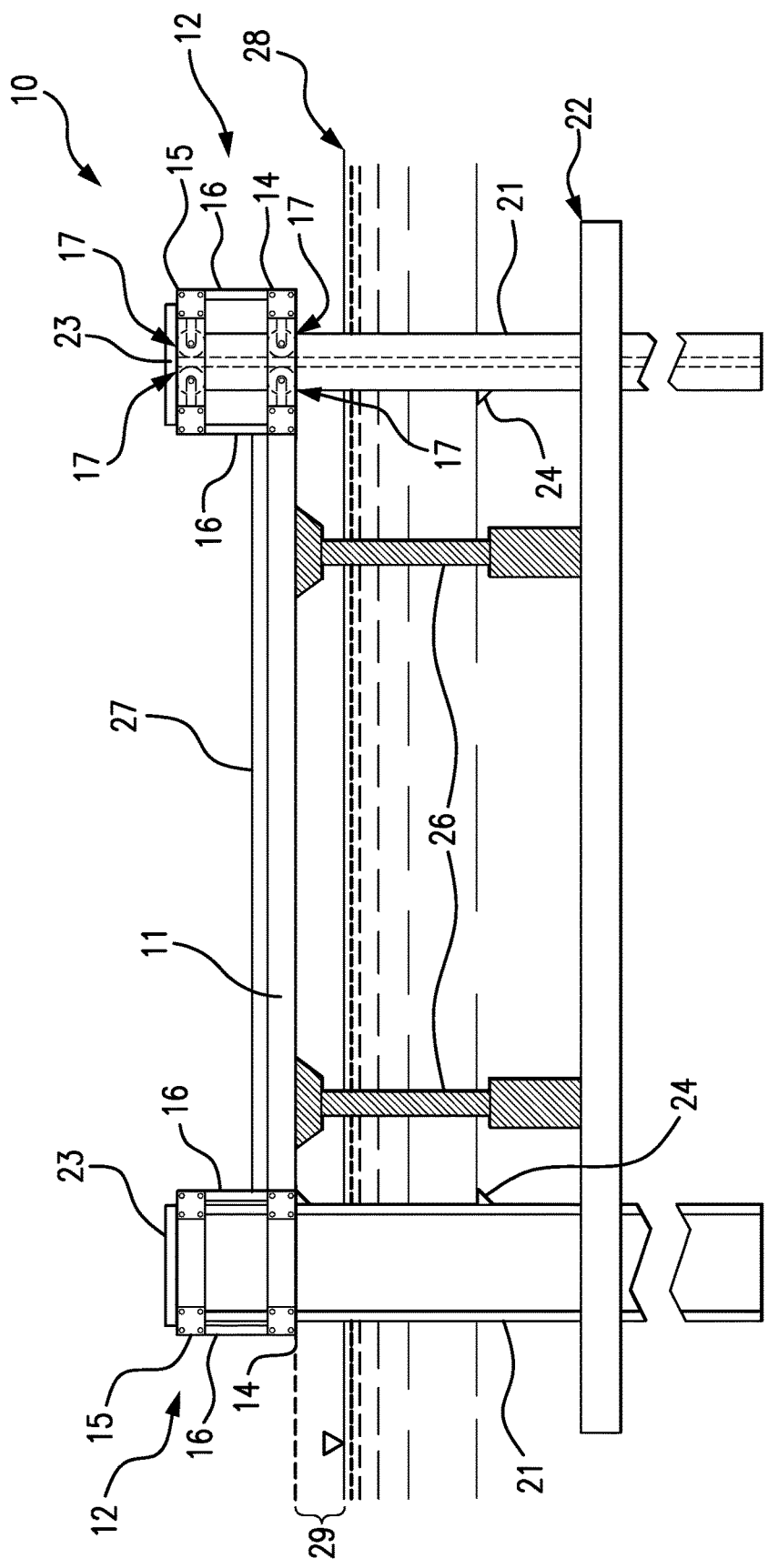
FIG. 4 is a side profile view of a house section lifted on a jackable house foundation support according to the preferred embodiment of the present invention.

Referring to FIGS. 3 and 4, the floor joist 27 of the building is supported on the foundation support platform 11. In the raised condition, depicted in FIG. 4, the lifting force of the hydraulic jacks 26 supports the platform 11 at the raised platform elevation 29 above the elevation of the flood waters 28, thereby preventing flood damage to the building. When the flood waters recede, the hydraulic jacks 26 are retracted and the cuboidal column guides 12 allow the platform 11 to slide back down, in response to gravity, to its non-raised elevation 25.

Figure 6:
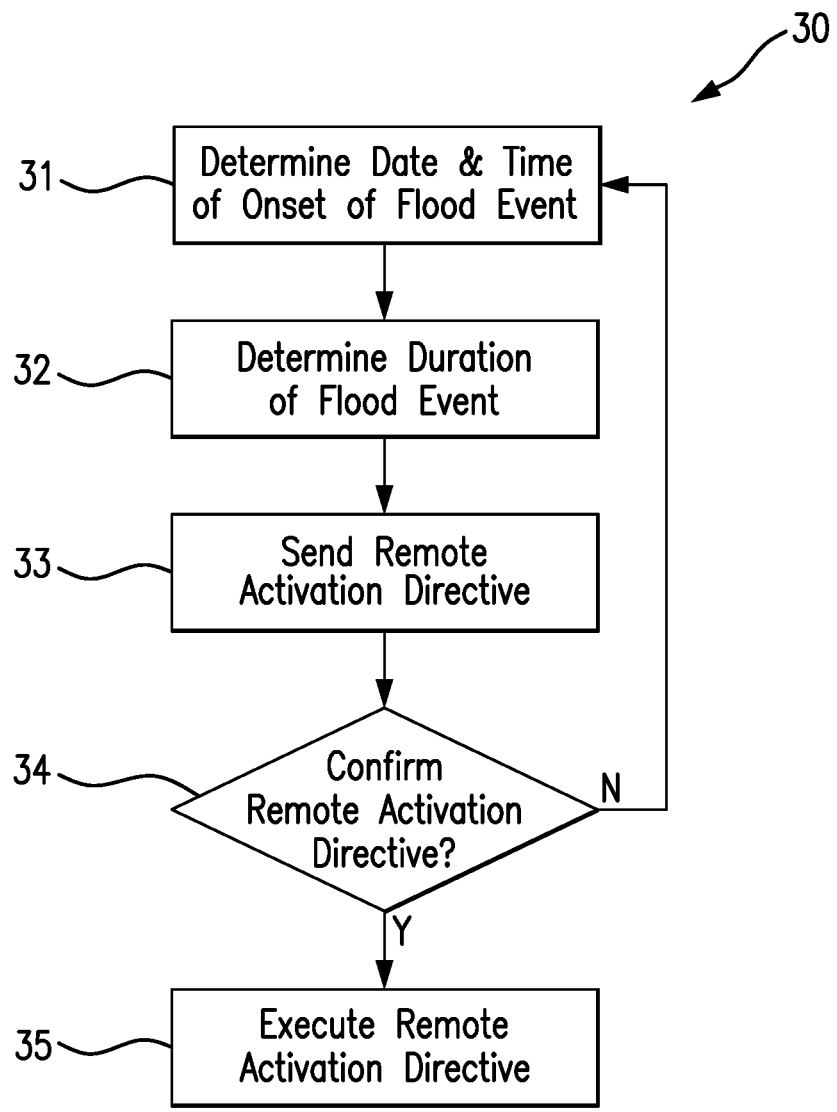
FIG. 6 is a flow chart for a remotely controlled embodiment of the jackable building foundation.

Referring to FIG. 6, an exemplary remote control system 30 for the jackable foundation determines, by reference to publically available weather data, the expected date and time of inset of a flood event 31, as well as the expected duration of the flood event 32. A remote activation directive 33 is sent via wireless telephone, wi-fi, rf and/or infrared signal to a system microprocessor or CPU which interfaces with the hydraulic jacks 26. After the system microprocessor/CPU confirms the remote activation directive 34, the hydraulic jacks 26 are activated 35 to lift the platform 11 to the raised platform elevation 29 above the flood elevation 28. At the end of the flood duration, the hydraulic jacks 26 are retracted to return the platform 11 to the non-raised platform elevation 25.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A jackable foundation for a building comprising:
   a rectangular steel foundation support platform, having four corners, and having a lower surface and an upper surface on which the building rests;
   four cuboidal column guides, wherein each cuboidal column guide is attached to one of the corners of the foundation support platform, and wherein each cuboidal column guide comprises two rectangularly interconnected square roller frames, consisting of a first tier roller frame, which is horizontally aligned with the foundation support platform, and a second tier roller frame, which is at a level above a level of the foundation support platform, and wherein each roller frame contains a pair of opposing roller mechanisms, each roller mechanism comprising a cylindrical roller, which is horizontally rotatably supported through an axial bore by a roller rod attached to the respective roller frame;
   four vertical flanged column beams, located at the four corners of the foundation support platform, each column beam having an upper and a lower terminus, with the lower terminus secured below an underlying grade elevation, and each column beam having two opposing faces disposed between two end flanges, wherein the paired roller mechanisms of each roller frame slidably engage the two opposing faces of one of the column beams, such that the foundation support platform has a slidable range of movement upward and downward along the column beams, and wherein the upward range of movement is constrained by four column caps located at the upper terminus of each column beam, and wherein the downward range of movement is constrained by four frame stop blocks laterally extending from each column beam at a non-raised platform elevation;
   one or more scissor jacks attached to the foundation platform, or attached to one or more of the cuboidal column guides, or attached to both the foundation support platform and to one or more of the cuboidal column guides, such that the one or more scissor jacks, when activated, cause the foundation support platform to slide upward along the column beams to a raised platform elevation, and such that the scissor jacks lift and support the building and the foundation support platform at the raised platform elevation; and
   wherein the first tier roller frame and the second tier roller frame of each cuboidal column guide are rigidly interconnected at four corners by vertical members, so as to form the cuboidal column guides as open cuboidal structures, and such that the vertical members resist any torque that tends to rotate the roller frames out of the horizontal plane or that tends to deform the cuboidal structures of the cuboidal column guides, thereby reducing the likelihood of jamming of the roller frames on the column beams.

2. The jackable foundation for a building according to claim 1, wherein the scissor jacks are designed to exert an overall lifting force that is vertically aligned with an overall center of gravity of the building and foundation support platform, so as to avoid generation of torques, which would otherwise tend to cause the foundation support platform to slide upward unevenly and tend to cause jamming of the roller frames on the column beams.

3. The jackable foundation for a building according to claim 2, wherein the column beams have orientations that alternate orthogonally at each corner of the foundation support platform, so that the roller frames of one corner are immobile with respect to a torque which would cause the roller frames of an opposite corner to slide, thereby reducing the likelihood of jamming of the roller frames on the column beams.

4. The jackable foundation for a building according to claim 3, further comprising a processing means, wherein the processing means receives and implements remote instructions to activate the scissor jacks, and thereby lift and support the building and the foundation support platform at the raised platform elevation, in advance of a forecasted flooding event, and to retract the scissor jacks, and thereby lower the building and the foundation support platform to the non-raised platform elevation after the forecasted flooding event.

5. The jackable foundation for a building according to claim 4, wherein the remote instructions are sent from a mobile device running an application software which enables input or retrieval of flood data regarding an expected date and time of onset of the forecasted flooding event and an expected duration of the forecasted flooding event for the purpose of remotely controlling the scissor jacks.

6. The jackable foundation for a building according to claim 1, wherein the column beams have orientations that alternate orthogonally at each corner of the foundation support platform, so that the roller frames of one corner are immobile with respect to a torque which would cause the roller frames of an opposite corner to slide, thereby reducing the likelihood of jamming of the roller frames on the column beams.

7. The jackable foundation for a building according to claim 6, further comprising a processing means, wherein the processing means receives and implements remote instructions to activate the scissor jacks, and thereby lift and support the building and the foundation support platform at the raised platform elevation, in advance of a forecasted flooding event, and to retract the scissor jacks, and thereby lower the building and the foundation support platform to the non-raised platform elevation after the forecasted flooding event.

8. The jackable foundation for a building according to claim 7, wherein the remote instructions are sent from a mobile device running an application software which enables input or retrieval of flood data regarding an expected date and time of onset of the forecasted flooding event and an expected duration of the forecasted flooding event for the purpose of remotely controlling the scissor jacks.

* * * * *